United States Patent
Fried et al.

(10) Patent No.: US 8,434,431 B2
(45) Date of Patent: *May 7, 2013

(54) CONTROL FOR ALCOHOL/WATER/GASOLINE INJECTION

(75) Inventors: Marcus Fried, Farmington Hills, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1970 days.

This patent is subject to a terminal disclaimer.

(21) Appl. No.: 11/384,074

(22) Filed: Mar. 17, 2006

(65) Prior Publication Data

US 2007/0119391 A1 May 31, 2007

Related U.S. Application Data

(63) Continuation-in-part of application No. 11/291,810, filed on Nov. 30, 2005.

(51) Int. Cl.
*F02B 47/02* (2006.01)

(52) U.S. Cl.
USPC .......................... 123/25 R; 123/1 A; 123/575

(58) Field of Classification Search ................ 123/25 R, 123/25 A, 25 C, 25 E, 25 J, 25 Q, 1 A, 1 R, 123/575, 406.31, 406.3, 406.29, 198 A
See application file for complete search history.

(56) References Cited

U.S. PATENT DOCUMENTS

| | | |
|---|---|---|
| 2,101,554 A | 12/1937 | Meyer |
| 2,221,405 A | 11/1940 | Nallinger |
| 3,589,348 A | 6/1971 | Reichhelm |
| 3,794,000 A | 2/1974 | Hodgkinson |
| 3,826,234 A | 7/1974 | Cinquegrani |
| 4,031,864 A | 6/1977 | Crothers |
| 4,122,803 A | 10/1978 | Miller |
| 4,136,652 A | 1/1979 | Lee |
| 4,205,650 A | 6/1980 | Szwarchier |
| 4,210,103 A | 7/1980 | Dimitroff et al. |
| 4,256,075 A | 3/1981 | Fukui et al. |
| 4,311,118 A | 1/1982 | Slagle |
| 4,325,329 A | 4/1982 | Taylor |
| 4,331,121 A | 5/1982 | Stokes |

(Continued)

FOREIGN PATENT DOCUMENTS

| | | |
|---|---|---|
| CN | 1536203 A | 10/2004 |
| DE | 19954979 A1 | 6/2001 |

(Continued)

OTHER PUBLICATIONS

U.S. Appl. No. 60/780,319, filed Mar. 8, 2006, Bromberg et al.

(Continued)

*Primary Examiner* — Noah Kamen
*Assistant Examiner* — Hung Q Nguyen
(74) *Attorney, Agent, or Firm* — Julia Voutyras; Alleman Hall McCoy Russell & Tuttle LLP

(57) ABSTRACT

A system for controlling an engine is described. In one example, fuel and a fluid are delivered to the engine cylinder, the fluid including at least some water. The amount of fuel and fluid delivered is adjusted in different ratios as a condition varies to address both pre-ignition and knock.

11 Claims, 8 Drawing Sheets

U.S. PATENT DOCUMENTS

| | | | |
|---|---|---|---|
| 4,385,593 A * | 5/1983 | Brooks | 123/1 A |
| 4,402,296 A | 9/1983 | Schwarz | |
| 4,411,243 A | 10/1983 | Hardenberg et al. | |
| 4,459,930 A | 7/1984 | Flory | |
| 4,480,616 A | 11/1984 | Takeda | |
| 4,489,596 A | 12/1984 | Linder et al. | |
| 4,499,885 A | 2/1985 | Weissenbach et al. | |
| 4,502,453 A | 3/1985 | Kabasin et al. | |
| 4,519,341 A * | 5/1985 | McGarr | 123/1 A |
| 4,541,383 A | 9/1985 | Jessel | |
| 4,558,665 A | 12/1985 | Sandberg et al. | |
| 4,590,904 A | 5/1986 | Wannenwetsch | |
| 4,648,367 A | 3/1987 | Gillbrand et al. | |
| 4,664,091 A * | 5/1987 | Royer | 123/494 |
| 4,706,630 A | 11/1987 | Wineland et al. | |
| 4,810,929 A | 3/1989 | Strumbos | |
| 4,817,576 A | 4/1989 | Abe et al. | |
| 4,930,537 A | 6/1990 | Farmer | |
| 4,945,881 A | 8/1990 | Gonze et al. | |
| 4,962,789 A | 10/1990 | Benscoter | |
| 4,993,386 A * | 2/1991 | Ozasa et al. | 123/25 J |
| 4,993,388 A * | 2/1991 | Mitsumoto | 123/406.42 |
| 4,998,518 A | 3/1991 | Mitsumoto | |
| 5,017,826 A | 5/1991 | Oshima et al. | |
| 5,018,483 A | 5/1991 | Kashima et al. | |
| 5,044,331 A | 9/1991 | Suga et al. | |
| 5,044,344 A | 9/1991 | Tuckey et al. | |
| 5,050,555 A | 9/1991 | Mitsumoto | |
| 5,056,490 A | 10/1991 | Kashima | |
| 5,056,494 A | 10/1991 | Kayanuma | |
| 5,060,610 A | 10/1991 | Paro | |
| 5,097,803 A | 3/1992 | Galvin | |
| 5,111,795 A | 5/1992 | Thompson | |
| 5,131,228 A | 7/1992 | Mochizuki et al. | |
| 5,150,683 A * | 9/1992 | Depa et al. | 123/406.45 |
| 5,174,247 A | 12/1992 | Tosa et al. | |
| 5,188,087 A | 2/1993 | Saito | |
| 5,193,508 A | 3/1993 | Motoyama et al. | |
| 5,204,630 A | 4/1993 | Seitz et al. | |
| 5,230,309 A | 7/1993 | Suga et al. | |
| 5,233,944 A | 8/1993 | Mochizuki | |
| 5,241,933 A | 9/1993 | Morikawa | |
| 5,335,637 A | 8/1994 | Davis et al. | |
| 5,336,396 A | 8/1994 | Shetley | |
| 5,357,908 A | 10/1994 | Sung et al. | |
| 5,360,034 A | 11/1994 | Der Manuelian | |
| 5,408,979 A | 4/1995 | Backlund et al. | |
| 5,417,239 A | 5/1995 | Ford | |
| 5,469,830 A | 11/1995 | Gonzalez | |
| 5,477,836 A | 12/1995 | Hyodo et al. | |
| 5,508,582 A | 4/1996 | Sugimoto et al. | |
| 5,515,280 A | 5/1996 | Suzuki | |
| 5,560,344 A | 10/1996 | Chan | |
| 5,565,157 A | 10/1996 | Sugimoto et al. | |
| 5,694,908 A | 12/1997 | Hsu | |
| 5,713,336 A | 2/1998 | King et al. | |
| 5,722,362 A | 3/1998 | Takano et al. | |
| 5,740,784 A | 4/1998 | McKinney | |
| 5,782,092 A | 7/1998 | Schultalbers et al. | |
| 5,806,500 A | 9/1998 | Fargo et al. | |
| 5,875,743 A | 3/1999 | Dickey | |
| 5,887,566 A | 3/1999 | Glauber et al. | |
| 5,921,222 A | 7/1999 | Freeland | |
| 5,979,400 A | 11/1999 | Nishide | |
| 6,017,646 A | 1/2000 | Prasad et al. | |
| 6,035,837 A | 3/2000 | Cohen et al. | |
| 6,042,955 A | 3/2000 | Okamoto | |
| 6,112,705 A | 9/2000 | Nakayama et al. | |
| 6,112,725 A | 9/2000 | McKinney | |
| 6,119,637 A | 9/2000 | Matthews et al. | |
| 6,189,516 B1 | 2/2001 | Hei Ma | |
| 6,213,086 B1 | 4/2001 | Chmela et al. | |
| 6,229,253 B1 | 5/2001 | Iwata et al. | |
| 6,234,123 B1 | 5/2001 | Iiyama et al. | |
| 6,237,339 B1 | 5/2001 | Asen et al. | |
| 6,318,083 B1 | 11/2001 | Machida et al. | |
| 6,325,039 B1 | 12/2001 | Goto | |
| 6,332,448 B1 | 12/2001 | Ilyama et al. | |
| 6,344,246 B1 | 2/2002 | Fischer et al. | |
| 6,371,151 B1 | 4/2002 | Saylor | |
| 6,382,225 B1 | 5/2002 | Tipton | |
| 6,467,470 B1 | 10/2002 | Carlsson et al. | |
| 6,494,192 B1 | 12/2002 | Capshaw et al. | |
| 6,505,579 B1 | 1/2003 | Lee | |
| 6,553,974 B1 | 4/2003 | Wickman et al. | |
| 6,617,769 B2 | 9/2003 | Suzuki | |
| 6,619,242 B2 | 9/2003 | Kaneko | |
| 6,622,663 B2 | 9/2003 | Weissman et al. | |
| 6,622,664 B2 | 9/2003 | Holder et al. | |
| 6,622,690 B2 | 9/2003 | Ando et al. | |
| 6,651,432 B1 | 11/2003 | Gray, Jr. | |
| 6,659,068 B2 | 12/2003 | Urushihara et al. | |
| 6,681,739 B2 | 1/2004 | Mamiya et al. | |
| 6,684,849 B2 | 2/2004 | zur Loye et al. | |
| 6,691,669 B2 | 2/2004 | Surnilla et al. | |
| 6,698,387 B1 | 3/2004 | McFarland et al. | |
| 6,711,893 B2 | 3/2004 | Ueda et al. | |
| 6,792,966 B2 | 9/2004 | Harvey | |
| 6,805,107 B2 | 10/2004 | Vinyard | |
| 6,845,616 B2 | 1/2005 | Jauss | |
| 6,866,950 B2 | 3/2005 | Connor et al. | |
| 6,928,983 B2 | 8/2005 | Mashiki | |
| 6,951,202 B2 | 10/2005 | Oda | |
| 6,959,693 B2 | 11/2005 | Oda | |
| 6,972,093 B2 | 12/2005 | Partridge et al. | |
| 6,978,762 B2 | 12/2005 | Mori | |
| 6,988,485 B2 | 1/2006 | Ichise et al. | |
| 6,990,956 B2 | 1/2006 | Niimi | |
| 7,011,048 B2 | 3/2006 | Gurin et al. | |
| 7,013,844 B2 | 3/2006 | Oda | |
| 7,055,500 B2 | 6/2006 | Miyashita et al. | |
| 7,082,926 B2 | 8/2006 | Sadakane et al. | |
| 7,107,942 B2 | 9/2006 | Weissman et al. | |
| 7,159,568 B1 | 1/2007 | Lewis et al. | |
| 7,178,503 B1 | 2/2007 | Brehob | |
| 7,225,787 B2 * | 6/2007 | Bromberg et al. | 123/198 A |
| 7,255,080 B1 | 8/2007 | Leone | |
| 7,261,064 B2 | 8/2007 | Bhaisora et al. | |
| 7,278,396 B2 | 10/2007 | Leone et al. | |
| 7,287,492 B2 | 10/2007 | Leone et al. | |
| 7,287,509 B1 | 10/2007 | Brehob | |
| 7,293,552 B2 | 11/2007 | Leone et al. | |
| 7,350,504 B2 | 4/2008 | Yasunaga et al. | |
| 7,367,317 B2 | 5/2008 | Miyazaki et al. | |
| 7,373,931 B2 | 5/2008 | Lennox et al. | |
| 7,406,947 B2 | 8/2008 | Lewis et al. | |
| 7,428,895 B2 | 9/2008 | Leone et al. | |
| 7,444,987 B2 | 11/2008 | Cohn et al. | |
| 7,454,285 B2 | 11/2008 | Christie et al. | |
| 7,487,631 B2 | 2/2009 | Cueman et al. | |
| 7,493,879 B2 | 2/2009 | Fujii et al. | |
| 7,493,897 B2 | 2/2009 | Arakawa et al. | |
| 7,556,023 B2 | 7/2009 | Ilhoshi et al. | |
| 7,584,740 B2 | 9/2009 | Boyarski | |
| 7,594,498 B2 | 9/2009 | Lewis et al. | |
| 7,637,250 B2 | 12/2009 | Bromberg et al. | |
| 7,640,913 B2 | 1/2010 | Blumberg et al. | |
| 7,640,914 B2 | 1/2010 | Lewis et al. | |
| 7,640,915 B2 | 1/2010 | Cohn et al. | |
| 7,676,321 B2 | 3/2010 | Andri | |
| 7,694,666 B2 | 4/2010 | Lewis et al. | |
| 7,703,446 B2 | 4/2010 | Bromberg et al. | |
| 7,721,710 B2 | 5/2010 | Leone et al. | |
| 7,726,265 B2 | 6/2010 | Bromberg et al. | |
| 7,765,982 B2 | 8/2010 | Lewis et al. | |
| 7,789,063 B2 | 9/2010 | Lewis et al. | |
| 7,845,315 B2 | 12/2010 | Leone et al. | |
| 7,849,842 B1 | 12/2010 | Lewis et al. | |
| 7,869,930 B2 | 1/2011 | Stein et al. | |
| 7,886,729 B2 | 2/2011 | Russell et al. | |
| 7,900,933 B2 | 3/2011 | Tones et al. | |
| 7,913,668 B2 | 3/2011 | Lewis et al. | |
| 7,942,128 B2 | 5/2011 | Leone et al. | |
| 7,971,575 B2 | 7/2011 | Lewis et al. | |
| 8,028,678 B2 | 10/2011 | Stein | |
| 8,065,979 B2 | 11/2011 | Leone et al. | |
| 2001/0035215 A1 | 11/2001 | Tipton et al. | |

| | | | |
|---|---|---|---|
| 2002/0139111 A1 | 10/2002 | Ueda et al. | |
| 2003/0089337 A1 | 5/2003 | Cohn et al. | |
| 2003/0127072 A1 | 7/2003 | Gmelin et al. | |
| 2003/0221660 A1 | 12/2003 | Surnilla et al. | |
| 2004/0035395 A1 | 2/2004 | Heywood et al. | |
| 2004/0065274 A1 | 4/2004 | Cohn et al. | |
| 2004/0083717 A1 | 5/2004 | Zhu et al. | |
| 2004/0149644 A1 | 8/2004 | Partridge et al. | |
| 2004/0250790 A1 | 12/2004 | Heywood et al. | |
| 2004/0261763 A1 | 12/2004 | Hashimoto et al. | |
| 2005/0051135 A1 | 3/2005 | Tomada et al. | |
| 2005/0066939 A1 | 3/2005 | Shimada et al. | |
| 2005/0097888 A1 | 5/2005 | Miyashita | |
| 2005/0103285 A1 | 5/2005 | Oda | |
| 2005/0109316 A1 | 5/2005 | Oda | |
| 2005/0109319 A1 | 5/2005 | Oda | |
| 2005/0155577 A1 | 7/2005 | Ichise et al. | |
| 2005/0155578 A1 | 7/2005 | Ichise et al. | |
| 2005/0166896 A1 | 8/2005 | Sadakane | |
| 2005/0172931 A1 | 8/2005 | Mori | |
| 2005/0178356 A1 | 8/2005 | Shibagaki | |
| 2005/0178360 A1 | 8/2005 | Satou | |
| 2005/0183698 A1 | 8/2005 | Yonezawa | |
| 2005/0274353 A1 | 12/2005 | Okubo et al. | |
| 2006/0016429 A1 | 1/2006 | Mashiki | |
| 2006/0075991 A1 | 4/2006 | Heywood et al. | |
| 2006/0090732 A1 | 5/2006 | Shibagaki | |
| 2006/0102136 A1 | 5/2006 | Bromberg et al. | |
| 2006/0102145 A1 | 5/2006 | Cohn et al. | |
| 2006/0102146 A1 | 5/2006 | Cohn et al. | |
| 2006/0180099 A1 | 8/2006 | Aimoto et al. | |
| 2006/0191727 A1 | 8/2006 | Usami et al. | |
| 2007/0028861 A1 | 2/2007 | Kamio et al. | |
| 2007/0028905 A1 | 2/2007 | Shinagawa et al. | |
| 2007/0034192 A1 | 2/2007 | Kamio et al. | |
| 2007/0119392 A1 | 5/2007 | Leone et al. | |
| 2007/0119394 A1 | 5/2007 | Leone | |
| 2007/0119411 A1 | 5/2007 | Kerns | |
| 2007/0119412 A1 | 5/2007 | Leone et al. | |
| 2007/0119413 A1 | 5/2007 | Lewis et al. | |
| 2007/0119414 A1 | 5/2007 | Leone et al. | |
| 2007/0119415 A1 | 5/2007 | Lewis et al. | |
| 2007/0119416 A1 | 5/2007 | Boyarski | |
| 2007/0119421 A1 | 5/2007 | Lewis et al. | |
| 2007/0119422 A1 | 5/2007 | Lewis et al. | |
| 2007/0119425 A1 | 5/2007 | Lewis et al. | |
| 2007/0204813 A1 | 9/2007 | Arai et al. | |
| 2007/0215069 A1 | 9/2007 | Leone | |
| 2007/0215071 A1 | 9/2007 | Dearth et al. | |
| 2007/0215072 A1 | 9/2007 | Dearth et al. | |
| 2007/0215101 A1 | 9/2007 | Russell et al. | |
| 2007/0215102 A1 | 9/2007 | Russell et al. | |
| 2007/0215104 A1 | 9/2007 | Hahn | |
| 2007/0215110 A1 | 9/2007 | Stein et al. | |
| 2007/0215111 A1 | 9/2007 | Surnilla | |
| 2007/0215125 A1 | 9/2007 | Dearth et al. | |
| 2007/0215127 A1 | 9/2007 | Dearth et al. | |
| 2007/0215130 A1 | 9/2007 | Shelby et al. | |
| 2007/0219674 A1 | 9/2007 | Leone | |
| 2007/0219679 A1 | 9/2007 | Coulmeau | |
| 2007/0219701 A1 | 9/2007 | Hashimoto et al. | |
| 2007/0221163 A1 | 9/2007 | Kamio | |
| 2007/0234976 A1 | 10/2007 | Dearth et al. | |
| 2007/0289573 A1 | 12/2007 | Leone et al. | |
| 2007/0295307 A1 | 12/2007 | Kerns | |
| 2008/0092851 A1 | 4/2008 | Arakawa et al. | |
| 2008/0288158 A1 | 11/2008 | Leone | |
| 2009/0065409 A1 | 3/2009 | Kamio et al. | |
| 2009/0178654 A1 | 7/2009 | Leone et al. | |
| 2010/0006050 A1 | 1/2010 | Bromberg et al. | |
| 2010/0024772 A1 | 2/2010 | Lewis et al. | |
| 2010/0288232 A1 | 11/2010 | Bromberg et al. | |
| 2011/0247586 A1 | 10/2011 | Zubeck et al. | |
| 2012/0028758 A1 | 2/2012 | Stein | |

FOREIGN PATENT DOCUMENTS

| | | | |
|---|---|---|---|
| EP | 1057988 | | 1/2006 |
| JP | 59068535 A | | 4/1984 |
| JP | 61065066 | | 9/1984 |
| JP | 62210229 A | | 9/1987 |
| JP | 01195926 A | | 8/1989 |
| JP | 02070968 A | | 3/1990 |
| JP | 03111664 A | * | 5/1991 |
| JP | 5163976 A | | 6/1993 |
| JP | 7019124 A | | 1/1995 |
| JP | 2002227730 A | | 8/2002 |
| JP | 2005146973 A | | 6/2005 |
| JP | 2007/056754 | | 8/2005 |
| JP | 200882258 A | | 4/2008 |
| RU | 2031238 C1 | | 3/1995 |
| WO | 9739235 A1 | | 10/1997 |
| WO | WO 2004/097198 | | 11/2004 |
| WO | 2006023313 A2 | | 3/2006 |
| WO | WO 2006/055540 | | 5/2006 |
| WO | WO 2007/106354 | | 9/2007 |
| WO | WO 2007/106416 | | 9/2007 |

OTHER PUBLICATIONS

U.S. Appl. No. 11/682,372, filed Mar. 6, 2007, Bromberg et al.
U.S. Appl. No. 11/782,050, filed Jul. 24, 2007, Bromberg et al.
U.S. Appl. No. 60/781,598, filed Mar. 10, 2006, Blumberg et al.
U.S. Appl. No. 11/683,564, filed Mar. 8, 2007, Bromberg et al.
U.S. Appl. No. 60/780,981, filed Mar. 10, 2006, Cohn et al.
U.S. Appl. No. 11/684,100, filed Mar. 9, 2007, Cohn et al.
U.S. Appl. No. 60/790,715, filed Apr. 10, 2006, Bromberg et al.
U.S. Appl. No. 60/746,507, filed May 5, 2006, Cohn et al.
U.S. Appl. No. 60/747,865, filed May 22, 2006, Heywood et al.
U.S. Appl. No. 60/832,836, filed Jul. 24, 2006, Bromberg et al.
U.S. Appl. No. 60/948,753, filed Jul. 10, 2007, Bromberg et al.
U.S. Appl. No. 60/973,499, filed Sep. 19, 2007, Bromberg.
U.S. Appl. No. 11/923,418, filed Oct. 24, 2007, Leone et al.
U.S. Appl. No. 11/924,395, filed Oct. 25, 2007, Brehob.
U.S. Appl. No. 11/464,172, filed Aug. 11, 2006, Stein.
U.S. Appl. No. 11/871,496, filed Oct. 21, 2007, Zubeck et al.
U.S. Appl. No. 11/955,246, filed Dec. 12, 2007, Pursifull et al.
U.S. Appl. No. 11/962,683, filed Dec. 21, 2007, Pursifull et al.
U.S. Appl. No. 11/566,131, filed Dec. 1, 2006, Blumberg et al.
U.S. Appl. No. 11/776,120, filed Jul. 11, 2007, Stein et al.
D.R. Cohn et al., "Direct Injection Ethanol Boosted Gasoline Engines: Biofuel Leveraging for Cost Effective Reduction of Oil Dependence and CO2 Emissions", Mar. 15, 2005, Massachusetts Institute of Technology.
L. Bromberg et al., "Calculations of Knock Suppression in Highly Turbocharged Gasoline/Ethanol Engines Using Direct Ethanol Injection", Jul. 7, 2005, Massachusetts Institute of Technology.
Stephen Russ, "A Review of the Effect of Engine Operating Conditions on Borderline Knock", SAE Technical Paper Series 960497, Feb. 26-29, 1996.
S. Brusca et al., "Water Injection in IC-SI Engines to Control Detonation and to Reduce Pollutant Emissions", SAE Technical Paper No. 2003-01-1912, May 19-22, 2003.
"Tech-Detonation", J & S Electronics; http://www.jandssafeguard.com/tech.html; the date of publication is at least as early as Feb. 8, 2006.
Hunter, M. Park, "1962 Oldsmobile Jetfire," originally appeared in Special Interest Autos, Apr. 1996, http://www.tctc.com/~park/mph/pageCLIP/page62JET/62jet.htm, Nov. 7, 2006.
Vance, Bill, "Turbocharger Boosted Engine's Efficiency: Developed to maintain high-altitude performance," for the Calgary Herald Edmonton, http://www.ucalgary.ca/~csimpson/Articles/JetFire.html, Nov. 7, 2006.
Office Action of Chinese Application No. 200610148453A, Issued Mar. 24, 2011, State Intellectual Property Office of PRC, 9 pages.
Thomas G. Leone et al., "On-Board Water Addition for Fuel Separation System," U.S. Appl. No. 13/302,280, filed Nov. 22, 2011, 25 pages.
Ross Dykstra Pursifull et al., "On-Board Fuel Vapor Separartion for Multi-Fuel Vehicle," U.S. Appl. No. 13/398,754, filed Feb. 16, 2012, 53 pages.
Donald J. Lewis et al., "Event Based Engine Control System and Method," U.S. Appl. No. 13/415,634, filed Mar. 8, 2012, 126 pages.

Unknown Author, "Honda Making Significant Progress on HCCI Engine for Hybrid Application," http://www.greencarcongress.com/2005/10/honda_making_si.html, Oct. 28, 2005, 8 pages.

Kamio, J. et al., "Study on HCCI-SI Combustion Using Fuels Containing Ethanol," SAE Technical Papers Series No. 2007-01-4051, Powertrain & Fluid Systems Conference & Exhibition, Rosemont IL, Oct. 29-Nov. 1, 2007, 12 pages.

ISA/UK, Intellectual Property Office Search Report of GB 0822341.4, Mar. 10, 2009, United Kingdom, 2 pages.

Australian examiner's first report on patent application No. 2007202600, Australian Government, IP Australia, Nov. 3, 2011, 2 pages.

* cited by examiner

CONTROL FOR ALCOHOL/WATER/GASOLINE INJECTION

The present application is a continuation-in-part of U.S. patent application Ser. No. 11/291,810, titled "FUEL MASS CONTROL FOR ETHANOL DIRECT INJECTION PLUS GASOLINE PORT FUEL INJECTION", filed Nov. 30, 2005, the entire contents of which are incorporated herein by reference in their entirety for all purposes.

BACKGROUND AND SUMMARY

Engines may use various forms of fuel delivery to provide a desired amount of fuel for combustion in each cylinder. One type of fuel delivery uses a port injector for each cylinder to deliver fuel to respective cylinders. Still another type of fuel delivery uses a direct injector for each cylinder.

Further, engines have been proposed using more than one type of fuel injection. For example, the papers titled "Calculations of Knock Suppression in Highly Turbocharged Gasoline/Ethanol Engines Using Direct Ethanol Injection" and "Direct Injection Ethanol Boosted Gasoline Engine: Biofuel Leveraging for Cost Effective Reduction of Oil Dependence and CO2 Emissions" by Heywood et al. are one example. Specifically, the Heywood et al. papers describes directly injecting ethanol to improve charge cooling effects, while relying on port injected gasoline for providing the majority of combusted fuel over a drive cycle. The ethanol provides increased charge cooling due to its increased heat of vaporization compared with gasoline, thereby reducing knock limits on boosting and/or compression ratio. Further, water may be included in the mixture. The above approaches purport to improve engine fuel economy and increase utilization of renewable fuels.

The inventors herein have recognized several issues with such an approach. Specifically, local availability and cost of various fuels can affect the type of fuel and/or water content, if any, supplied to the vehicle. As such, to take advantage of local availability and cost structures, the customer may use a range of alcohol/water/hydrocarbon ratios for the engine to utilize. However, the composition of the fuel may not only affect its knock suppression capability, but may also affect its tendency toward pre-ignition, as well as the flame speed of the overall air-fuel mixture. In other words, engine power and fuel economy may be compromised due to the effect of the variation in alcohol/water/hydrocarbon ratios of the knock suppression fluid.

As such, in one approach, a system for an engine is provided. The system comprises a cylinder located in the engine; a delivery system configured to deliver fuel and a fluid to at least an engine cylinder while the vehicle is traveling on the road, said fluid including at least some water; and a controller for varying an amount of said fuel and fluid delivered to the cylinder in different ratios as a condition varies, said controller further varying a spark timing of a spark in said cylinder as an amount of water in said fluid varies.

In this way, it is possible to adjust spark timing to accommodate variation in water delivered to the engine, thereby enabling more advantage of knock suppression while reducing likelihood of pre-ignition. For example, in the example where 100% ethanol is used in a secondary injection for knock suppression, engine operation near the spark knock limit may initiate pre-ignition under some conditions. Whereas when using knock suppression injection with a higher water content, pre-ignition may be much less likely near the spark knock limit. Thus by using the composition of the knock suppression fuel in the control system, it is possible to adjust ignition timing to take advantage of current conditions, as well as to accommodate variation in water content.

DETAILED DESCRIPTION

Figure 1:
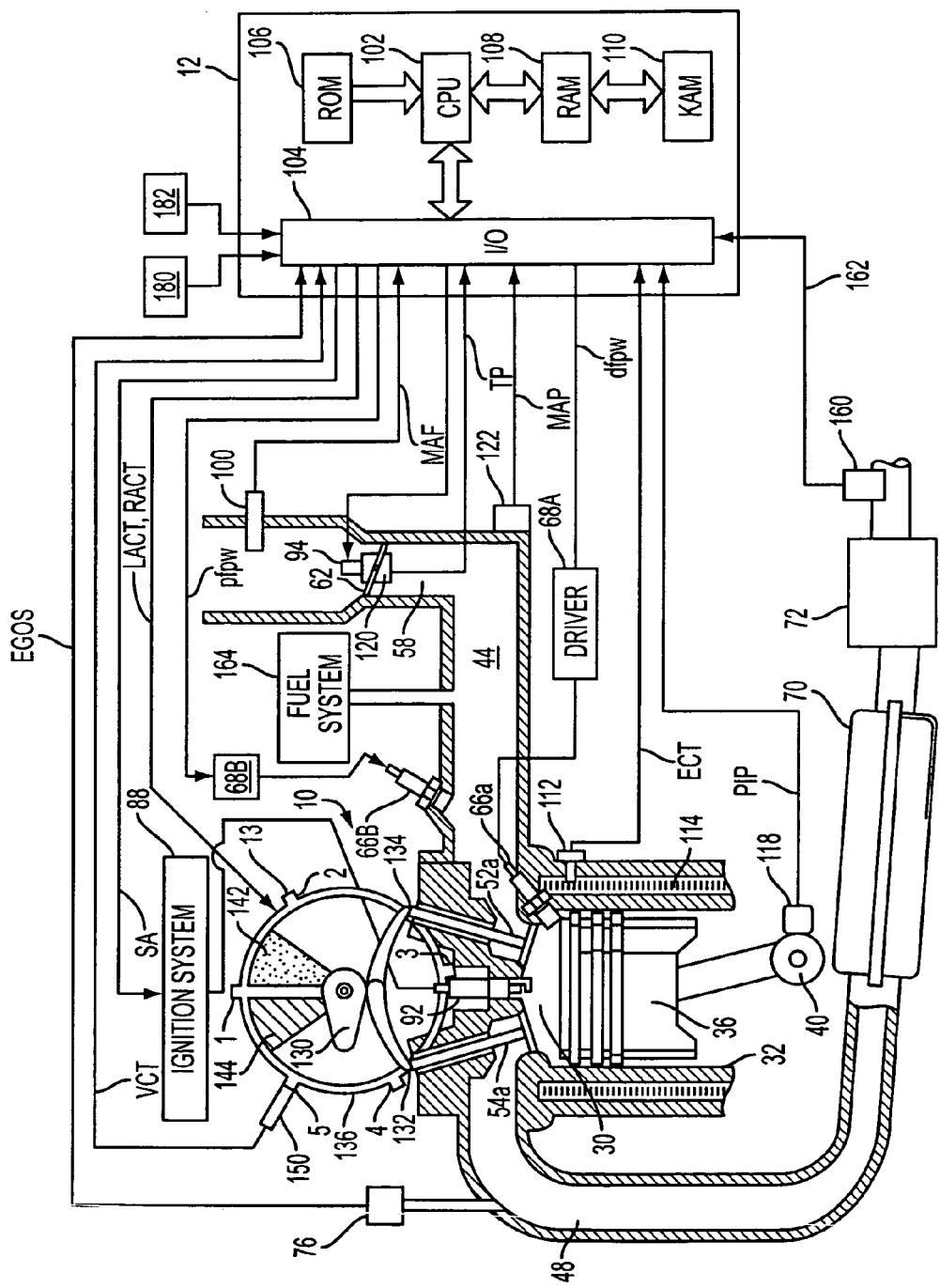
FIG. 1 shows a partial engine view.

FIG. 1 shows one cylinder of a multi-cylinder engine, as well as the intake and exhaust path connected to that cylinder. In the embodiment shown in FIG. 1, engine 10 is capable of using at least two different fuel types, and/or two different injection types, in one example. For example, engine 10 may use gasoline and an alcohol including fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), a mixture of an alcohol and water, a mixture of an alcohol, water, and gasoline, etc. In another embodiment, a single injector (such as a direct injector) may be used to inject a mixture of two fuel types (e.g., gasoline and an alcohol/water mixture), where the ratio of the two fuel quantities in the mixture may be varied during engine operation via adjustments made by controller 12 via a mixing valve, for example. In still another example, two different injectors for each cylinder are used, such as port and direct injectors. In even another embodiment, different sized injectors, in addition to different locations and different fuels, may be used.

As will be described in more detail below, various advantageous results may be obtained by various of the above systems. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock. This phenomenon, combined with increased compression ratio, and/or boosting and/or engine downsizing, can then be used to obtain large fuel economy benefits (by reducing the knock limitations on the engine). However, when combusting a mixture having alcohol, the likelihood of pre-ignition may be increased under certain operating conditions. As such, by utilizing water, for example, in injection having alcohol, it may be possible to reduce the likelihood of pre-ignition, while still taking advantage of increased charge cooling effects and the availability of alcohol including fuels. However, while use of water and alcohol to increase charge cooling can reduce the tendency of knock and thus enable more advanced spark timing and thus improved fuel economy, water and alcohol may have different effects on pre-ignition. For example, increased water in the combustion chamber may tend to decrease pre-ignition, while increased alcohol may tend to increase pre-ignition.

As noted herein, an injection type may refer to different injection locations, different compositions of substances being injected (e.g., water, gasoline, alcohol), different fuel blends being injected, different alcohol contents being injected (e.g., 0% vs. 85%), etc. Further note that different injection types may also refer to different substances being injected via a common injector, where a type 1 injection may be a gasoline amount in the injection and type 2 injection may be an alcohol/water mixture amount in the injection.

Returning to FIG. 1, it shows one example fuel system with two fuel injectors per cylinder, for at least one cylinder. Further, each cylinder of the engine may have two fuel injectors. The two injectors may be configured in various locations, such as two port injectors, one port injector and one direct injector (as shown in FIG. 1), or others.

Also, as described herein, there are various configurations of the cylinders, fuel injectors, and exhaust system, as well as various configurations for the fuel vapor purging system and exhaust gas oxygen sensor locations.

Continuing with FIG. 1, it shows a multiple injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68. While FIG. 1 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (not shown) including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68. Note that a single driver 68 may be used for both fuel injection systems, or multiple drivers may be used. Fuel system 164 is also shown in schematic form delivering vapors to intake manifold 44. Various fuel systems and fuel vapor purge systems may be used.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and/or a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

While FIG. 1 shows two injectors for the cylinder, one being a direct injector and the other being a port injector, in an alternative embodiment two port injectors for the cylinder may be used, along with open valve injection, for example.

Emission control device 72 is shown positioned downstream of catalytic converter 70. Emission control device 72 may be a three-way catalyst or a NOx trap, or combinations thereof.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. Further, this sensor, along with engine speed, can provide an estimate of charge (including air) inducted into the cylinder. In one example, sensor 118, which is also used as an engine speed sensor, produces a predetermined number of equally spaced pulses every revolution of the crankshaft.

Continuing with FIG. 1, a variable camshaft timing system is shown. Specifically, camshaft 130 of engine 10 is shown communicating with rocker arms 132 and 134 for actuating intake valves 52*a*, 52*b* and exhaust valves 54*a*, 54*b*. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52*a*, 52*b* and exhaust valves 54*a*, 54*b* open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52*a*, 52*b*, and exhaust valves 54*a*, 54*b* open and close at a time later than normal relative to crankshaft 40.

While this example shows a system in which the intake and exhaust valve timing are controlled concurrently, variable intake cam timing, variable exhaust cam timing, dual independent variable cam timing, or fixed cam timing may be used. Further, variable valve lift may also be used. Further, camshaft profile switching may be used to provide different cam profiles under different operating conditions. Further still, the valvetrain may be roller finger follower, direct acting mechanical bucket, electromechanical, electrohydraulic, or other alternatives to rocker arms.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification, as described later herein. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the O2 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 1 merely shows one cylinder of a multi-cylinder engine, and it is understood that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling valve timing.

As noted above, engine 10 may operate in various modes, including lean operation, rich operation, and "near stoichiometric" operation. "Near stoichiometric" operation can refer to oscillatory operation around the stoichiometric air fuel ratio. Typically, this oscillatory operation is governed by feedback from exhaust gas oxygen sensors. In this near stoichiometric operating mode, the engine may be operated within approximately one air-fuel ratio of the stoichiometric air-fuel ratio.

Feedback air-fuel ratio control may be used for providing the near stoichiometric operation. Further, feedback from exhaust gas oxygen sensors can be used for controlling air-fuel ratio during lean and during rich operation. In particular, a switching type, heated exhaust gas oxygen sensor (HEGO) can be used for stoichiometric air-fuel ratio control by controlling fuel injected (or additional air via throttle or VCT) based on feedback from the HEGO sensor and the desired air-fuel ratio. Further, a UEGO sensor (which provides a substantially linear output versus exhaust air-fuel ratio) can be used for controlling air-fuel ratio during lean, rich, and stoichiometric operation. In this case, fuel injection (or additional air via throttle or VCT) can be adjusted based on a desired air-fuel ratio and the air-fuel ratio from the sensor. Further still, individual cylinder air-fuel ratio control could be used, if desired. Adjustments may be made with injector 66A, 66B, or combinations thereof depending on various factors, to control engine air-fuel ratio.

Figure 2:
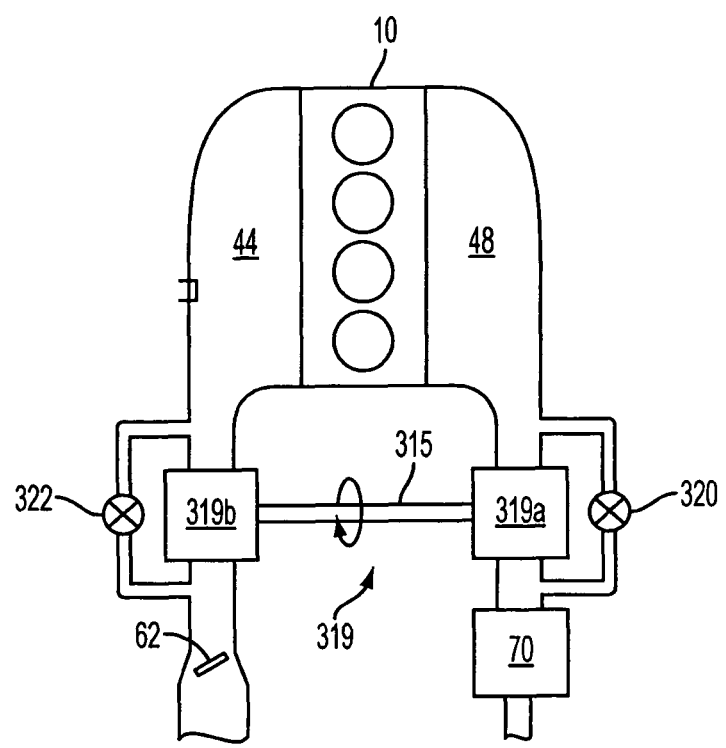
FIG. 2 shows an engine with a turbocharger.

Also note that various methods can be used to maintain the desired torque such as, for example, adjusting ignition timing, throttle position, variable cam timing position, exhaust gas recirculation amount, and number of cylinders carrying out combustion. Further, these variables can be individually adjusted for each cylinder to maintain cylinder balance among all the cylinders. While not shown in FIG. 1, engine 10 may be coupled to various boosting devices, such as a supercharger or turbocharger, as shown in FIG. 2. On a boosted engine, desired torque may also be maintained by adjusting wastegate and/or compressor bypass valves.

Referring now specifically to FIG. 2, an example engine 10 is shown with four in-line cylinders. In one embodiment, engine 10 may have a turbocharger 319, which has a turbine 319a coupled to the exhaust manifold 48 and a compressor 319b coupled to the intake manifold 44. While FIG. 2 does not show an intercooler, one may optionally be used. Turbine 319a is typically coupled to compressor 319b via a drive shaft 315. Various types of turbochargers and arrangements may be used. For example, a variable geometry turbocharger (VGT) may be used where the geometry of the turbine and/or compressor may be varied during engine operation by controller 12. Alternately, or in addition, a variable nozzle turbocharger (VNT) may be used when a variable area nozzle is placed upstream and/or downstream of the turbine in the exhaust line (and/or upstream or downstream of the compressor in the intake line) for varying the effective expansion or compression of gasses through the turbocharger. Still other approaches may be used for varying expansion in the exhaust, such as a waste gate valve. FIG. 2 shows an example bypass valve 320 around turbine 319a and an example bypass valve 322 around compressor 319b, where each valve may be controller via controller 12. As noted above, the valves may be located within the turbine or compressor, or may be a variable nozzle.

Also, a twin turbocharger arrangement, and/or a sequential turbocharger arrangement, may be used if desired. In the case of multiple adjustable turbocharger and/or stages, it may be desirable to vary a relative amount of expansion though the turbocharger, depending on operating conditions (e.g. manifold pressure, airflow, engine speed, etc.). Further, a mechanically or electrically driven supercharger may be used, if desired.

Figure 3:
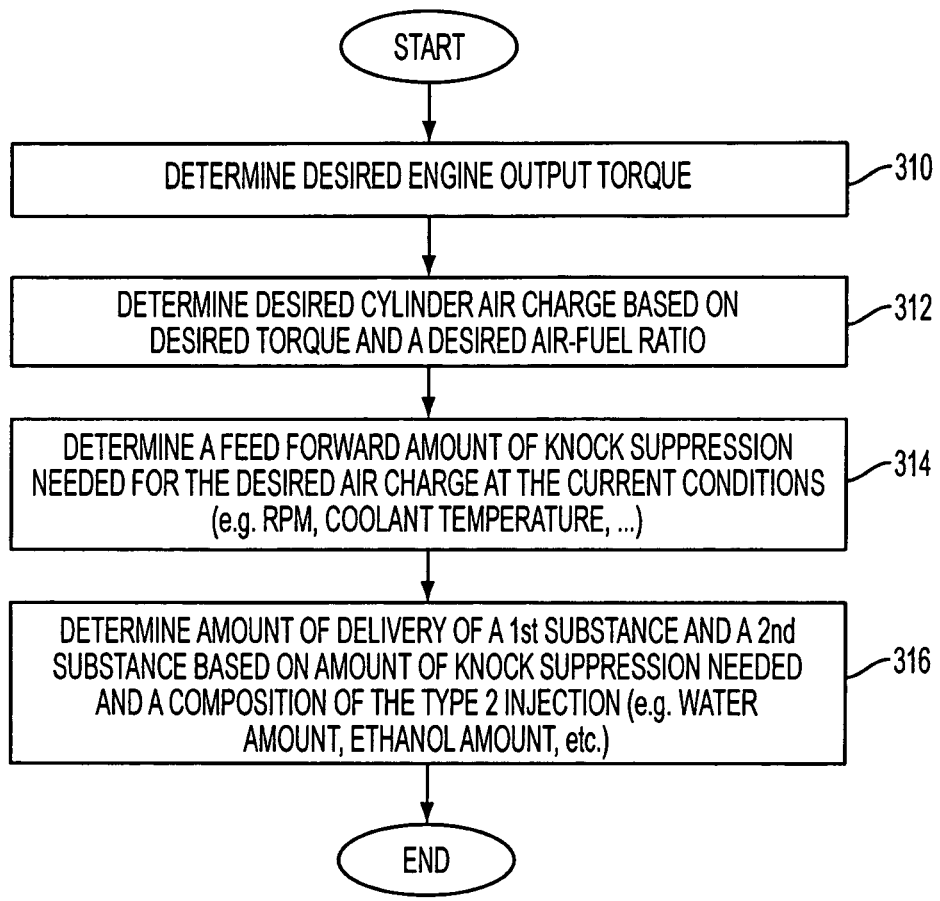
FIGS. 3, 5-6, and 8 show high level control flow charts.
Figure 5:
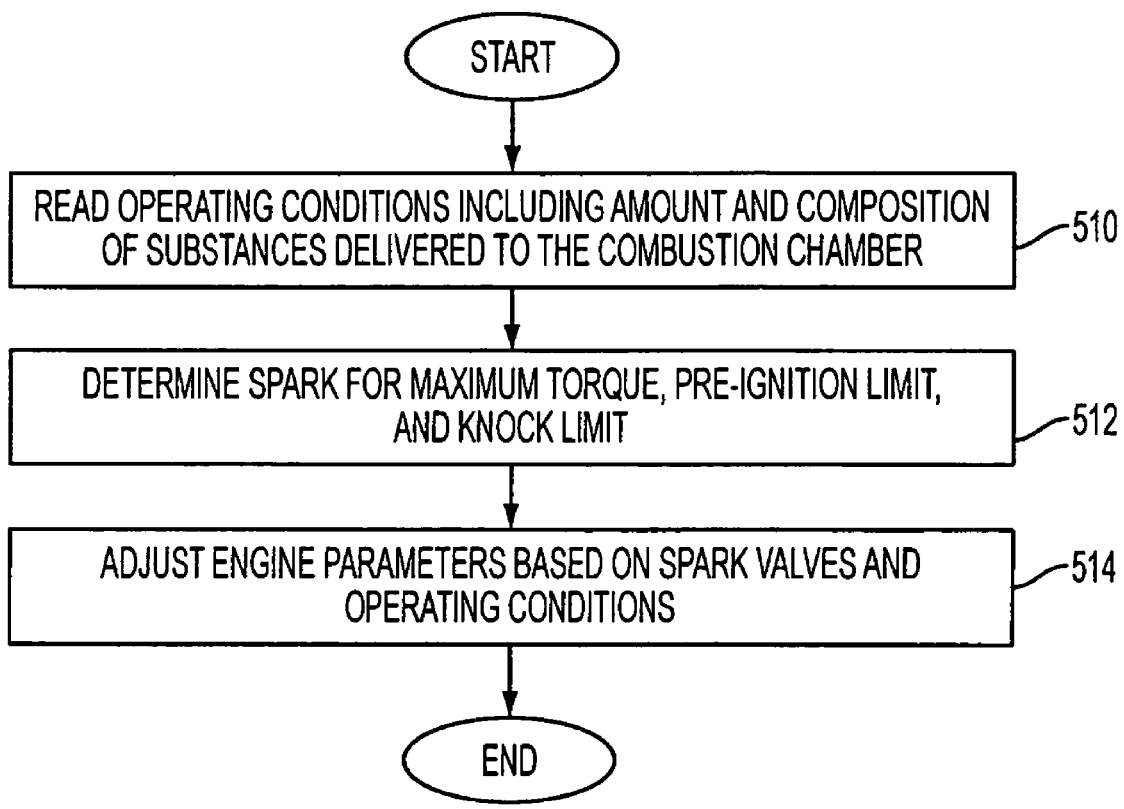
Figure 6:
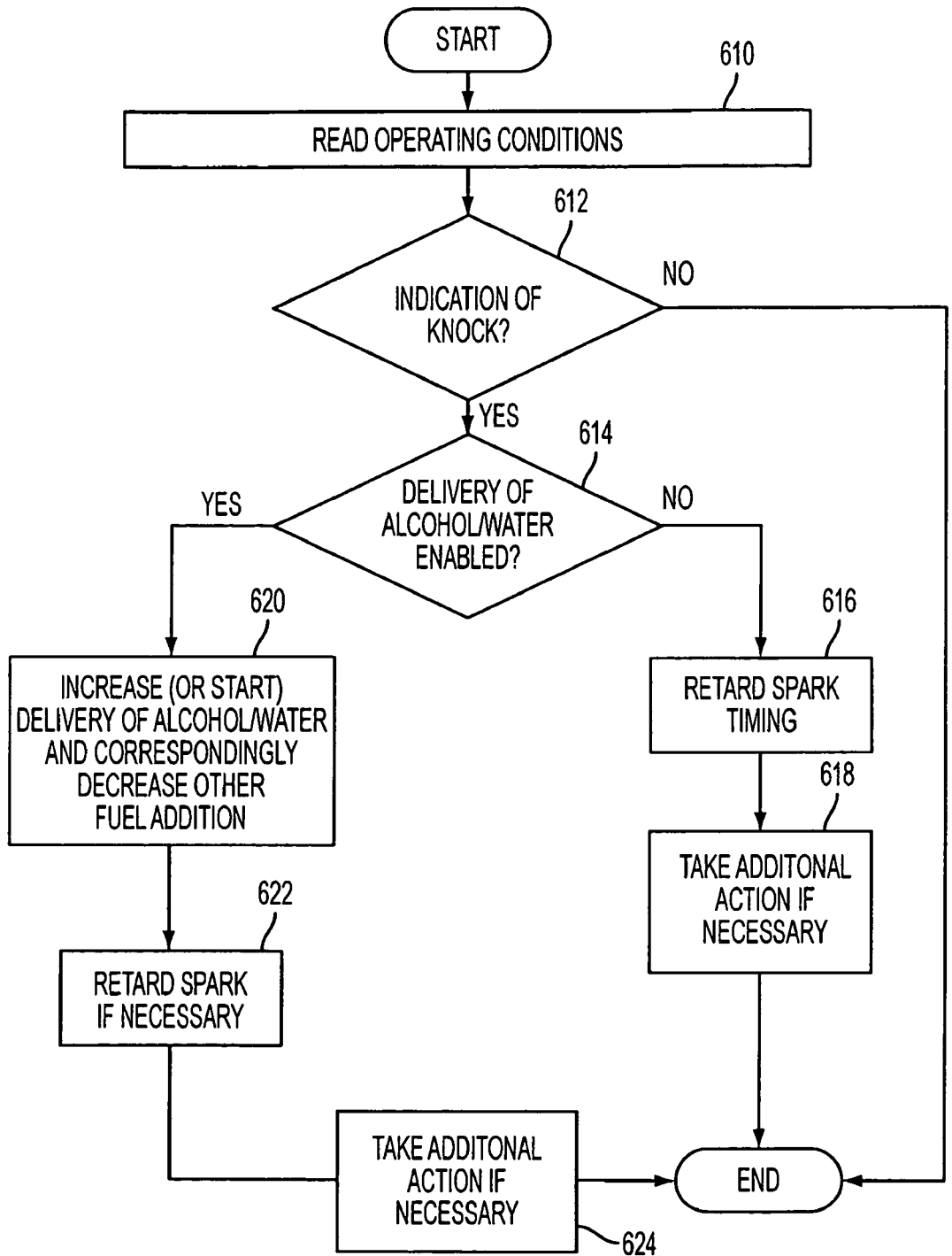

Referring now to FIGS. 3, 5, and 6, example routines are described for controlling engine and/or vehicle operation. For example, the routines may utilize information regarding the composition of an injection and/or fuel type. If water is contained in a fuel being injected, an estimate of the amount of water (absolute, fractional, etc.) may be used to advantage in controlling operation. Thus, when using separate injection of a first and second substance, by providing an accurate estimate of a water fraction in the second substance, for example, it is possible to provide appropriate amounts of the first and second substances to enable improved spark timing, reduced knock tendency, and reduced potential for pre-ignition.

Referring now specifically to FIG. 3, an example routine is described for controlling engine operation based on a water fraction of an ethanol/water blend provided to a cylinder in varying ratios to an amount of gasoline provided to the cylinder. However, the approach and method may be applied to various combinations of substances and injection types, for example.

In 310, the routine determines a desired engine output, such as a desired engine output torque, based on various operating conditions, such as driver pedal position, vehicle speed, gear ratio, etc. Next, in 312, the routine determines a desired cylinder air charge amount based on the desired output and a desired air-fuel ratio. In 314, the routine determines a feedforward amount of knock suppression needed for the desired output at the current operating conditions (e.g., air-fuel ratio, RPM, engine coolant temperature, among others). Alternatively, the routine may determine a desired charge cooling or knock reduction based on current operation conditions, and optionally based on feedback from a knock sensor or other sensor indicative of knock.

Figure 4:
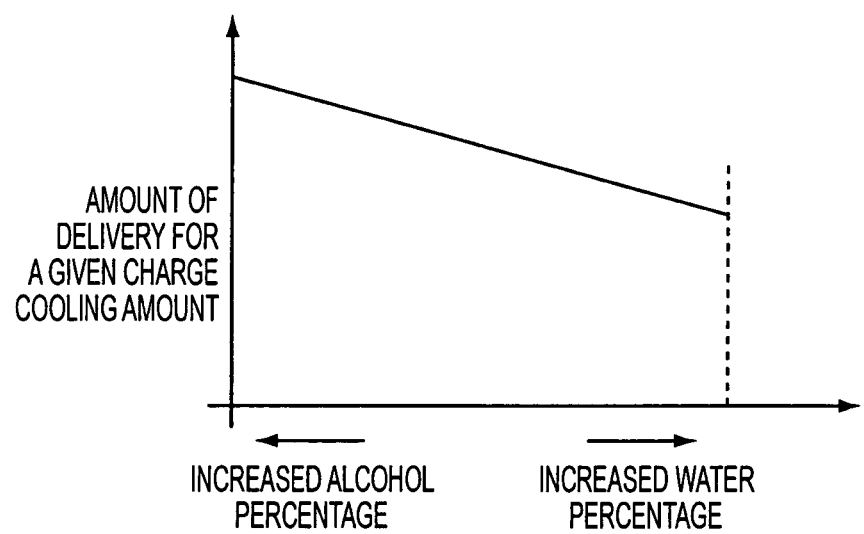
FIG. 4 show a graph illustrating the effects of varying water content on operating parameters.

Continuing with FIG. 3, in 316 the routine determines a delivery amount of a first substance (e.g. a hydrocarbon fuel) and a second substance (e.g., a knock suppression fluid having any mixture of water, hydrocarbons, and alcohol) delivered to the cylinder based on the amount of knock suppression needed and a composition of the substances (e.g., the water fraction or amount, the alcohol fraction or amount, or others). As shown by FIG. 4, depending on the composition of the substance used to improve charge cooling, either a greater or lesser knock suppression effect may be achieved (note that while a linear curve is shown, this is just one example, and the curve may be nonlinear, and also note that this is just one curve shown for a single desired amount of charge cooling—a different curve may be used for each amount of charge cooling, providing a family of curves).

FIG. 4 illustrates that for an example knock suppression fluid having water and ethanol, due to a greater charge cooling effect of water, as the water fraction or percentage increases, a smaller delivery quantity (or PW) of the water/ethanol mixture may be desired. Further, as the water fraction increases, adjustment to the delivery of fuel is needed as less combustible knock suppression fluid is provided via ethanol/water mixture.

Such compensation can be advantageously provided in 316. Further, 316 may determine a timing of delivery of the first and/or second substance amounts (e.g., the fuel and/or knock suppression fluid), and whether the amounts will be delivered concurrently or separately, for example. Further, the routine may check whether, in the case where the substances are delivered via separate injectors, that the corresponding pulsewidth values do not fall below a minimum pulsewidth value, and if so, adjusting injection operation.

Various advantages may be achieved by such operation. In one example, it is possible to use knowledge of a water fraction or amount in a substance or mixture being delivered to the combustion chamber to provide a correct amount of charge cooling to reduce knock, even when the water fraction is changing. Further, it is possible to maintain accurate engine air-fuel ratio control and torque output by compensating for variability in water fraction by appropriate adjustment of the injector(s) based on the water amount or fraction.

In this way, it is possible to use water injection, or a blend of water and alcohol injection, to increase compression ratio and/or boost pressure due to decreased knock at high loads, while also reducing the likelihood of pre-ignition. Further, the above routine may be used to compensate for variability in the water fraction and alcohol (e.g., ethanol) fraction of the mixture. Further, a vehicle customer may be able to achieve improved engine operation using one or both of a water and an alcohol based fuel as a knock suppression fluid in the engine.

Figure 7A:
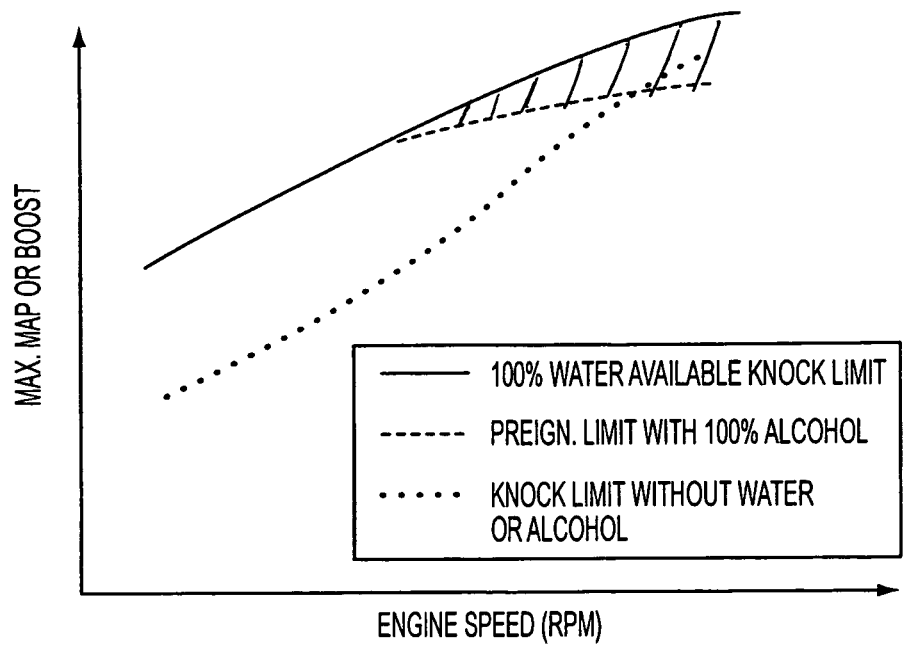
FIG. 7 shows example trends of knock and pre-ignition at wide-open throttle.
Figure 7B:
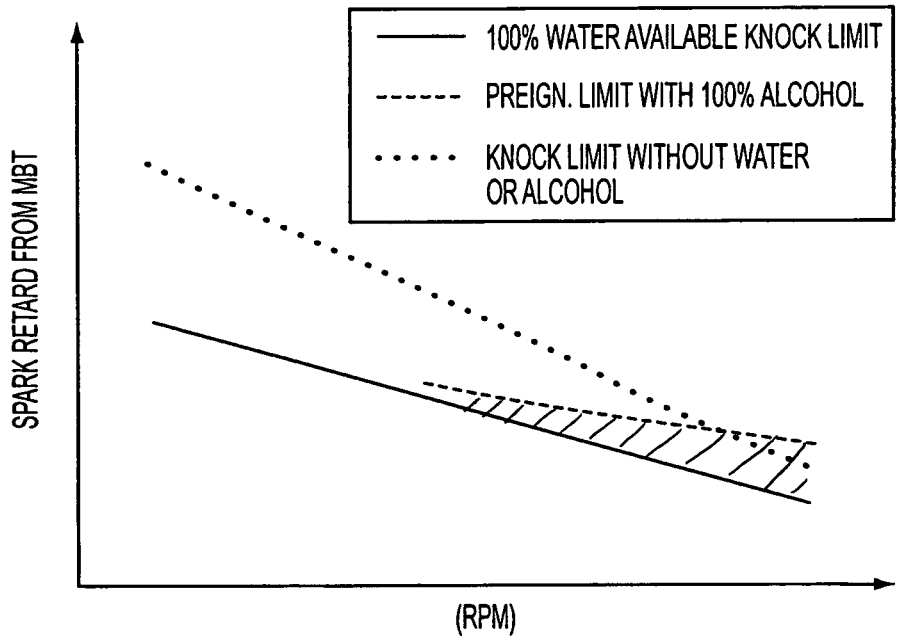

While the above routine illustrates variation in relative delivery amounts of different substances to the combustion chamber to improve knock suppression, various parameters may be adjusted as the water amount or fraction in a substance (e.g., a water/ethanol blend) varies. For example, the measured or inferred water fraction or amount may be used to adjust spark timing. In other words, if a varying relative amount of water is provided in the substance used in the vehicle (e.g., a varying water amount in an alcohol/water blend supplied by the customer to the vehicle), the composition of the mixture will affect many parameters having an impact on the desired spark timing. For example, the water amount will determine its knock suppression capability, its pre-ignition tendency, as well as the flame speed of the overall air-fuel mixture. Engine power and/or fuel economy may be compromised if the composition of the knock suppression fluid is not used to adjust engine settings such as spark timing, injection timing, manifold pressure etc. For instance, with a 100% ethanol knock suppression fuel, engine operation near the spark knock limit may cause pre-ignition. Whereas, with a knock suppression fuel with a higher water content, the likelihood of pre-ignition danger near the spark knock limit may be significantly reduced. An example of these trends at wide-open throttle is illustrated in FIG. 7 (the details will vary for each engine design, and will also vary with speed, load, temperature, etc.). By using the composition of the knock suppression fuel in the control system to adjust parameters such as spark timing, boost level, throttle position, etc., it is possible to use more advanced spark timings, more boost, etc. under some conditions with higher water content, and less advanced timings, less boost, etc. under some conditions with a lower water content. In this way, for any water/alcohol/hydrocarbon mixture provided to the engine, optimum performance and efficiency may be achieved. Further, by using knowledge of the composition of the knock suppression fluid is possible to expand operation into at least some of the shaded areas of FIG. 7, and thus manage the degrading effects of pre-ignition and the difficulty in detecting pre-ignition which may otherwise limit peak power and performance of the engine.

Referring now to FIG. 5, a routine is described for adjusting spark timing. In 510, the routine reads various operating parameters, including engine speed (RPM), manifold absolute pressure (MAP), air charge temperature (ACT), engine coolant temperature (ECT), cam phasing/timing, and the amounts and composition of substances (e.g., gasoline, alcohol, and/or water) delivered to the combustion chamber. Then, in 512, the routine determines the following spark timings using the composition of the substances (316) in conjunction with the other engine operating parameters from 514: an MBT (max brake torque) spark setting, a pre-ignition based spark limit, and a spark-knock limited spark setting. For example, MBT spark and spark-knock limited spark timing vary with percent of alcohol in a gasoline-alcohol mixture. Similarly, it is important to account for the water/alcohol composition as well as the ratio of gasoline to water/alcohol injection.

These ignition timing limits can then be used in 516 to control the following engine operating variables to optimize engine operation for best fuel economy or best power for a given knock suppression fuel composition, while reducing the likelihood of pre-ignition: MAP (throttle and/or boost settings), spark timing (which can be limited to be the minimum of the timings of 514), cam phasing, fuel delivery (e.g., gasoline and/or water/alcohol injection amounts and/or timings), charge motion control device settings, intake manifold tuning device settings, knock sensor based feedback spark control gains, and/or combinations thereof.

For example, pre-ignition may become more likely as an alcohol (e.g., ethanol) fraction of the total fuel mass is increased, which may be caused by decreased water in the mixture and/or variation of injection amounts with variation in operating conditions). As such, the maximum allowed air charge (e.g., boost and/or throttle settings) may be reduced under conditions where pre-ignition may occur. Example trends at wide-open throttle are illustrated in FIG. 7 (the details will vary for each engine design, and will also vary with speed, load, temperature, etc.). In other words, under conditions of a higher water fraction, the control system may increase delivery of a knock suppression substance (e.g., direct injection of fuel, direct injection of a water/alcohol mixture, port injection during open valve injection of fuel, etc.) in response to either knock or a likelihood of pre-ignition. Alternatively, with a lower water fraction, the system should increase delivery of a knock suppression substance in response to knock, but decrease boost pressure in response to pre-ignition or under conditions where pre-ignition may be more likely. If necessary, all fuel flow could be turned off until boost is low enough in response to pre-ignition. However, as pre-ignition may be difficult to respond to, a sufficient margin should be provided to avoid pre-ignition from occurring. Thus, with lower water fraction compositions in the combustion chamber, boost may be limited or reduced and/or the amount of alcohol delivery may be limited or reduced for a given operating condition, whereas with higher water fraction compositions, allowed boost may be increased and/or the amount of alcohol/water delivery may be increased.

In this way, it is possible to improve engine operation in view of the increased knock reduction capabilities while compensating for any increased likelihood of pre-ignition due to variability in an amount of alcohol provided to the engine cylinders.

In addition, a recommendation may be provided to the driver of a preferred alcohol/water mixture, for example, for the directly injected substance. The recommendation may be a ratio or relative amount that provides improved power or overall best cost/mile of vehicle fueling. In this way, the customer may optimize performance for a given driving condition, and the above control system could accommodate such changes.

Referring now to FIG. 6, a routine is described for reacting to an indication of engine knock, such as from a knock sensor, cylinder pressure sensor, ionization sensor, or other indication that knock is occurring, or is about to occur. In 610 the routine reads current operating conditions, such as speed, load, etc. Then, in 612, the routine determines whether a measure of knock from knock sensor 182 has reached a threshold value thus providing an indication of knock. As noted above, various other indications may be used, if desired.

If knock is indicated in 612, the routine continues to 614 to determine whether delivery of a knock suppression substance (e.g., whether delivery of alcohol and/or water, or a mixture thereof, or various substances as noted herein) is enabled. In other words, the routine determines whether conditions are acceptable to use a delivery of a knock suppression substance, such as, for example, based on availability of knock suppression fluids, coolant temperature, time since an engine start, and/or combinations thereof. If not, the routine proceeds to 616 to retard spark timing to reduce knock, and then takes additional actions in 618, optionally, if necessary, such as reducing airflow, etc.

If the answer to 614 is yes, the routine proceeds to 620 to increase delivery of a knock suppression substance or fluid and correspondingly decrease other fuel delivery (e.g., port gasoline injection), assuming such an increase is acceptable given potential limits on increasing alcohol delivery under conditions that may increase likelihood of pre-ignition. For example, a desired ethanol amount or ratio to gasoline may be increased, but limited at values that may increase the likelihood of pre-ignition. Also, the amount of increase and/or decrease may be varied depending on an amount of water in the knock suppression fluid or substance delivery (e.g., an amount/percentage of water in a water/ethanol direction injection).

In other words, resort to spark retard and other operations as noted herein to reduce knock may be used if delivery of a knock suppression fluid having alcohol/water, for example, is near a maximum available or allowed amount (e.g., due to limits related to pre-ignition). Thus, in 622, spark may optionally be retarded relative to its current timing before or concurrently adjustment of 620, and then returned once the fuel adjustments have been effective. Further, other adjustments may be made, such as reducing boosting, reducing manifold pressure, etc., as noted in 624. Note that the combination of spark timing and knock suppression fluid or substance adjustment may be beneficial in that the spark timing change may have a faster response on knock than the fuel change under some conditions. However, once the knock suppression fluid or substance adjustment has been effected, the spark timing may be returned to avoid fuel economy losses. In this way, fast response and low losses can be achieved. Under other conditions, only spark adjustments, or fuel adjustments without spark adjustments may be used so that even temporary retard of spark timing is reduced.

As noted above, boost may be adjusted (e.g., via a variable geometry turbocharger, electrically controlled supercharger, adjustable compressor bypass valve, or a waste gate) in response to an amount of water (or relative amount of water) delivered to the combustion chamber, speed, desired torque, transmission gear ratio, etc.

Example trends at wide-open throttle of knock and pre-ignition are illustrated in FIG. 7, the details will vary for each engine design, and will also vary with speed, load, temperature, etc. Specifically, the top graph shows the maximum boost or manifold pressure versus engine speed and how the limits may vary depending on the amount of water, alcohol, etc. being used. The solid line shows operating with 100% water supplied via direct injection with port injected gasoline in the cylinder mixture, for example. The dotted line shows the reduced boost or manifold pressure limits due to knock where no supplemental injection or delivery of water or alcohol is supplied in the cylinder mixture. Finally, the dashed line shows the pre-ignition limit when using direct injection of 100% alcohol. While in this example, the dashed and dotted lines cross, this is just one example and whether or not the lines cross may depend on engine design among other factors. Further, while the graph illustrates the limits with certain percentages, operation with blends of alcohol and water, for example, will result in different limits as noted above.

The shaded area of FIG. 7 illustrates the area of engine operation that would be prohibited without some information or knowledge of the fuel and knock suppression fluid compositions.

The bottom graph of FIG. 7 illustrates the spark retard from MBT at the above limit operations. The bottom graph thus illustrates example trends of how spark timing may vary depending on the composition of the cylinder mixture among hydrocarbons, alcohol, and water. For example, at low engine speeds, an increased water percentage for a given amount of injection will enable advanced spark timing compared with no water and no alcohol, although less advance as engine speed increases. Again, while in this example, the dashed and dotted lines cross, this is just one example and whether or not the lines cross may depend on engine design among other factors.

Figure 8:
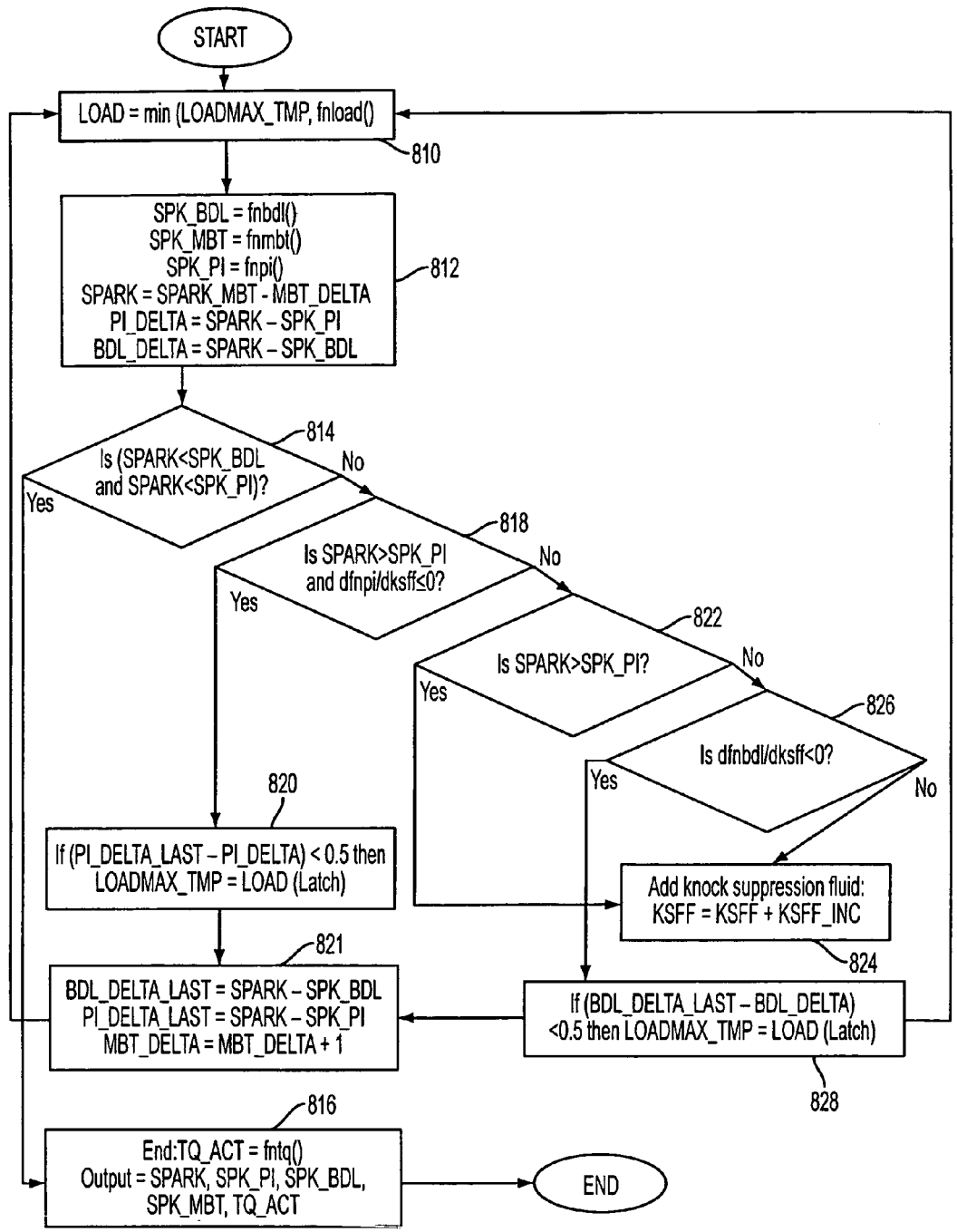

Referring now to FIG. 8, an alternative embodiment of a routine for controlling engine operation is illustrated. Specifically, FIG. 8 shows an engine load and spark optimizer for an engine using secondary knock suppression fluid delivery.

In this routine, the following definitions are used:
N=Engine speed
PW=Percent water in knock suppression fluid
PA=Percent alcohol in fuel
ECT=Engine Coolant Temperature
ACT=Air charge temperature
KSFF=Ratio of mass of fuel/knock suppression fluid injected
AF=Air/fuel ratio
MBT_DELTA=SPK_MBT−SPARK (distance from MBT)
TQ_DES=desired torque
KSFF_INC=the amount to increment KSFF with each iteration, may be a fixed calibration parameter.

Further, the following functions are used in the routine, where the functions may be generated from engine mapping data or physical models:
Borderline Spark: SPK_BDL=fnbdl(N,LOAD, AF, PW, PA, ECT, ACT, KSFF)
Pre-ignition spark threshold: SPK_PI=fnpi((N, LOAD, AF, PW, PA, ECT, ACT, KSFF)
LOAD=fiiload(AF, TQ_DES, N, PW, PA, KSFF, ECT, ACT, MBT_DELTA)
Actual Torque: TQ_ACTUAL=fntq((AF, LOAD, N, ECT, ACT, MBT_DELTA)
Dfnpi/dksff=partial derivative of fnpi with respect to KSFF
Dfnbdl/dksff=partial derivative of fnbdl with respect to KSFF One aim of the routine that given a requested torque output (TQ_DES, which may be based on idle speed control, driver request and gear ratio, cruise control, etc.), engine speed (N), ECT, ACT, and AF, and the function mentioned above, the routine will find SPARK and LOAD settings as follows in priority order:
1. TQ_DES at SPK_MBT with a minimum possible or reduced amount of knock suppression fuel.
2. TQ_DES at SPK_BDL if possible.
3. TQ_DES at SPK_PI if possible
4. Maximum torque possible within the limits of SPK_PI, SPK_BDL, and maximum possible LOAD.

Specifically, the routine starts by reading in current operating parameters, including TQ_DES, LAMBSE, N, ECT, ACT, CHT, BP, PA, and PW, and setting several parameters to zer0 (MBT_DELTA=0, KSFF=0). Further, the routine looks up the temporary maximum load as a fiction of various parameters (LOADMAX_TMP=fnloadmax( )), including those noted herein. Next, in 810, the routine calculates a load parameter (LOAD) as the minimum of a load function fnload mapped across the following parameters: AF, TQ_DES, N, PW, PA, KSFF, ECT, ACT, and MBT_DELTA, and the temporary maximum load. Specifically, the routine calculates the desired load to be provided as the maximum possible given the boosting, throttle, and ambient conditions, or that which gives the torque requested. This represents a first estimate of the desired operating conditions to provide the desired torque at the current conditions at optimum spark angle and without using any of a knock suppression fluid.

Next, in 812, the routine calculates various spark parameters using the following functions and equations at the current conditions as: SPK_BDL=fnbdl( ), SPK_MBT=fnmbt( ), SPK_PI=fnpi( ), SPARK=SPARK_MBT−MBT_DELTA, PI-DELTA=SPARK−SPK_PI, and BDL_DELTA=SPARK−SPK_BDL.

Then, in 814 the routine determines whether SPARK is less than SPK_BDL and SPARK is less than SPK_PI. Specifically, the routine determines whether it is possible to operate at the MBT timing without encountering pre-ignition or borderline knock. If so, the routine continues to 816 and outputs the estimated torque TQ_ACT based on the function (fntq( )), and outputs the following parameters: SPARK, SPK_PI, SPK_BDL, SPK_MBT, and TQ_ACT. In this case, no additional knock suppression fuel, load increase, or spark retard is utilized.

If not, the routine continues to 818 to determine if the desired spark is above the pre-ignition limit and if further addition of the knock suppression fluid reduce or increase the likelihood of pre-ignition. Thus, if adding additional knock suppression fluid will only cause the desired spark to be more pre-ignition prone, then the routine proceeds to 820. In 820, no additional knock suppression fluid is added, and the routine determines whether it is possible to increase engine load to reduce the likelihood of pre-ignition (rather than or in addition to retarding spark). So, in 820, the routine determines that if increasing load only increases pre-ignition chance, the load it latched, or limited, to the current load and the routine continues to 821. In 821, the routine incrementally retards spark timing and updates several intermediate values, before returning to 810 to again repeat the process.

If the answer to 818 is no, then adding knock suppression fluid will reduce chances of pre-ignition, and the routine continues to 822 to determine whether spark timing is past a pre-ignition limit. If so, the routine continues to 824 to increase an amount of knock suppression fluid delivery by a incremental factor (KSFF_INC), and then the routine returns to 810 to repeat. Otherwise, the cylinder is not pre-ignition limited and the routine continues to 826 to determine whether adding or increasing knock suppression fluid will reduce the likelihood of knock. If so, the routine continues to 824. Otherwise, the routine continues to 828 to determine whether a load increase will reduce the likelihood of pre-ignition, similar to that of 820. From 828, the routine continues to 821 to adjust spark timing to account for any load increase, or to reduce knock after load increasing has ceased to be effective.

So, in one example, in response to pre-ignition and/or engine knock, the routine may first utilized addition or adjustment of a knock suppression fluid delivery amount, second attempt to increase engine load and correspondingly retard spark timing, and third retard spark without increasing load. Further, sub-combinations may be used, depending on the operating conditions. Thus, in another example (e.g. under a different set of conditions), the routine may first increase load and then retard spark timing. In this way, it is possible to improve overall system performance while still achieving increased fuel economy targets.

It will be appreciated that the configurations, systems, and routines disclosed herein are exemplary in nature, and that these specific embodiments are not to be considered in a limiting sense, because numerous variations are possible. For example, the above approaches can be applied to V-6, I-3, I-4, I-5, I-6, V-8, V-10, V-12, opposed 4, and other engine types.

As another example, engine 10 may be a variable displacement engine in which some cylinders (e.g., half) are deactivated by deactivating intake and exhaust valves for those cylinders. In this way, improved fuel economy may be achieved. However, as noted herein, in one example injection using multiple types of fuel delivery (e.g., fuel composition or delivery location) can be used to reduce a tendency of knock at higher loads. Thus, by operating with direct injection of a fuel including alcohol (such as ethanol or an ethanol blend) during cylinder deactivation operation, it may be possible to extend a range of cylinder deactivation, thereby further improving fuel economy.

As will be appreciated by one of ordinary skill in the art, the specific routines described herein in the flowcharts and the specification may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated steps or functions may be repeatedly performed depending on the particular strategy being used. Further, these figures graphically represent code to be programmed into the computer readable storage medium in controller 12. Further still, while the various routines may show a "start" and "end" block, the routines may be repeatedly performed in an iterative manner, for example.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle traveling on a road, the engine having a cylinder and a fuel delivery system, comprising:
   delivering to said engine cylinder fuel having at least gasoline via a first injector and a fluid including at least some water and alcohol via a second injector during at least one condition;
   varying an amount of injection of said first and second injectors to deliver a varying ratio from said first and second injectors as said at least one condition varies and in response to indications of pre-ignition and engine knock; and
   varying a spark timing of a spark in said cylinder as an amount of water in said fluid varies and as said amounts of injection of said first and second injectors vary.

2. The method of claim 1 further comprising varying said spark timing based on a maximum brake torque spark timing limit, a pre-ignition spark timing limit, and a knock spark timing limit, each of which is based on said amount of water.

3. The method of claim 2 wherein said alcohol includes ethanol, and wherein said amount of water in said fluid is a percentage of water to ethanol in said fuel.

4. The method of claim 2 further comprising adjusting a relative amount of injection of each of said first and second injectors in response to an indication of engine knock, where a size of each of said adjustments varies as said amount of water in said fluid varies.

5. The method of claim 1 further comprising a boosting apparatus coupled to the engine, and, for a given operating condition, reducing at least one of boost and said amount of injection from said second injector as said amount of water decreases, and increasing at least one of boost and said amount of injection from said second injector as said amount of water increases.

6. The method of claim 1 wherein said first injector is a port injector configured to deliver at least gasoline to the cylinder, and wherein said second injector is a direct injector configured to deliver at least a water and ethanol mixture to the cylinder, and further comprising varying an amount of direct injection and port injection for a given operating condition based on said amount of water.

7. The method of claim 1 wherein under conditions where pre-ignition may occur, reducing a maximum allowed air charge by adjusting boost or throttle settings.

8. The method of claim 1 wherein said fluid is a knock suppression fluid, and wherein said cylinder has a first spark timing for a first amount of water in the fluid and a second spark timing for a second amount of water in the fluid, the second spark timing advanced from the first spark timing when the second amount of water is greater than the first amount of water.

9. A method for an engine of a vehicle traveling on a road, the engine having a cylinder and a fuel delivery system, comprising:
 delivering fuel and a fluid to at least said engine cylinder while the vehicle is traveling on the road, said fluid including at least some water;
 varying an amount of said fuel and fluid delivered to the cylinder in different ratios as a condition varies, where said amount of said fluid delivered is based on an amount of water in the fluid; and
 varying each of a spark timing of a spark in said cylinder, an air amount of said cylinder, and said amount of said fluid in response to indications of pre-ignition and engine knock, the spark timing based on the amount of water in the fluid.

10. A method for an engine, comprising:
 boosting the engine;
 delivering a mixture of water and alcohol directly to cylinders of the engine, including:
  under mixture conditions of increased water, increasing delivery of the mixture in response to knock and pre-ignition; and
  under mixture conditions of decreased water, increasing delivery of the mixture in response to knock, but decreasing boost pressure in response to pre-ignition; and
 varying a spark timing based on said mixture.

11. The method of claim 10 further comprising, under mixture conditions of increased water, advancing spark timing and increasing boost pressure, and under mixture conditions of decreased water, using a less advanced spark timing and decreasing boost pressure.

* * * * *